(12) United States Patent
Hernandez Mascarell

(10) Patent No.: US 8,478,449 B2
(45) Date of Patent: Jul. 2, 2013

(54) WIND TURBINE CONTROL METHODS AND SYSTEMS

(75) Inventor: Octavio Hernandez Mascarell, Sarriguren (ES)

(73) Assignee: Gamesa Innovation & Technology, S.L., Sarriguren (ES)

( * ) Notice: Subject to any disclaimer, the term of this patent is extended or adjusted under 35 U.S.C. 154(b) by 252 days.

(21) Appl. No.: 12/869,091

(22) Filed: Aug. 26, 2010

(65) Prior Publication Data

US 2011/0049885 A1 Mar. 3, 2011

(30) Foreign Application Priority Data

Sep. 3, 2009 (ES) .................................... 200901821

(51) Int. Cl.
*G05D 11/00* (2006.01)
(52) U.S. Cl.
USPC ................................ 700/287; 290/44; 416/36
(58) Field of Classification Search
USPC .................................. 700/287; 290/44; 416/36
See application file for complete search history.

(56) References Cited

U.S. PATENT DOCUMENTS

| | | | | |
|---|---|---|---|---|
| 2003/0044274 A1* | 3/2003 | Deane et al. | ...................... | 416/1 |
| 2006/0033338 A1* | 2/2006 | Wilson | ............................ | 290/44 |
| 2007/0007769 A1* | 1/2007 | Basteck | ........................ | 290/1 C |
| 2008/0284171 A1* | 11/2008 | Cory | ................................ | 290/44 |
| 2009/0187282 A1* | 7/2009 | Menke et al. | ................. | 700/287 |
| 2009/0218818 A1* | 9/2009 | Cardinal et al. | ............... | 290/44 |
| 2009/0220340 A1* | 9/2009 | Pierce et al. | .................... | 416/36 |
| 2009/0254223 A1* | 10/2009 | Helle et al. | ..................... | 700/287 |
| 2010/0158687 A1* | 6/2010 | Dawson et al. | ................. | 416/31 |
| 2010/0230966 A1* | 9/2010 | Pavlak | ............................ | 290/44 |
| 2011/0112697 A1* | 5/2011 | Arinaga et al. | .............. | 700/287 |

* cited by examiner

*Primary Examiner* — Mohammad Ali
*Assistant Examiner* — Anthony Whittington
(74) *Attorney, Agent, or Firm* — Ladas & Parry LLP

(57) ABSTRACT

A method of controlling the operation of a variable speed wind turbine (11), tracking a power curve (25, 27) including a nominal operational region (3) and sub-nominal operational regions (2, 1, 0), comprising steps of: a) implementing a control strategy to follow said power curve in said nominal operational region (3) based on the use of demanded torque $T_d$ for controlling power P and on the use of demanded pitch $\theta_d$ for controlling demanded torque $T_d$; b) implementing a control strategy to follow said power curve in sub-nominal operational regions (2, 1, 0) based on the use of demanded torque $T_d$ for controlling power P and on the setting of a constant optimum value for demanded pitch $\theta_d$ in each sub-nominal operational region (2, 1, 0). The invention also refers to a control system comprising one or more Adaptive Predictive Controllers (51, 53, 55, 59).

12 Claims, 3 Drawing Sheets

WIND TURBINE CONTROL METHODS AND SYSTEMS

FIELD OF THE INVENTION

The invention relates to variable speed wind turbine control methods and systems and, in particular, to variable speed wind turbine control methods and systems using an adaptive predictive approach.

BACKGROUND

Wind turbines are devices that convert mechanical energy to electrical energy. A typical wind turbine includes a nacelle mounted on a tower housing a drive train for transmitting the rotation of a rotor to an electric generator and other components such as a yaw drive which rotates the wind turbine, several controllers and a brake. The rotor supports a number of blades extending radially therefrom for capturing the kinetic energy of the wind and causing the driving train rotational motion. The rotor blades have an aerodynamic shape such that when a wind blows across the surface of the blade, a lift force is generated causing the rotation of a shaft which is connected—directly or through a gearing arrangement—to the electrical generator located inside the nacelle. The amount of energy produced by wind turbines is dependent on the rotor blade sweeping surface that receives the action from the wind and consequently increasing the length of the blades leads normally to an increase of the power output of the wind turbine.

Under known control methods and systems the power produced by a wind turbine increases with wind speed until a rated nominal power output is reached and then it is maintained constant. This is done regulating the pitching action of the blades so that the rotor blade's pitch angle is changed to a smaller angle of attack in order to reduce power capture and to a greater angle of attack to increase the power capture. Therefore the generator speed, and consequently, the power output may be maintained relatively constant with increasing wind velocities.

However in case of gusts and turbulences wind speed may change drastically in a relatively small interval of time requiring relatively rapid changes of the pitch angle of the blades to maintain constant the power output that are difficult to implement taking into account the dynamics of the pitch control actuator and the inertia of the mechanical components. As a result, generator speed may exceed the over speed limit and the wind turbine is shut down to avoid damages.

The power and rotor speed regulation implemented in most of the known commercial wind turbine control systems is based on a Proportional-Integral-Derivative (PID) approach which reacts to already produced errors between measured variables and its set points with its associated limitations.

In order to solve this problem there are known several proposals of control systems improving its performance particularly under wind speed varying conditions such as the proposal disclosed in WO 2008/046942 A1.

On the other hand there are known many general-purpose control systems. One of them is the adaptive predictive control system disclosed in Spanish Patents 460649 and 2206315 but the applicant does not know any proposal of an adaptive predictive control system for wind turbines.

Adaptive predictive controllers drive the controlled variable to desired values (set points) reacting to non-already produced errors. These controllers are based on an internal plant model in order to predict its future states. A second functionality is introduced when adapting the internal plant dynamic model parameters in order to take into account the plant evolutions. This kind of controllers require information in execution time which differs from the one used by the PID controllers. Consequently the use of these controllers in particular areas can not be carried out without deep strategy studies.

Therefore the known proposals involve the use of more information (particularly statistical data) than in commercial control systems and/or improved tools for the analysis of the relevant information but none of them provide a clear control strategy, easy to implement, that can cope with situations of rapid changes of the wind speed.

This invention is intended to solve this drawback.

SUMMARY OF THE INVENTION

It is an object of the present invention to provide wind turbine control methods and systems that can cope with situations of rapid changes of the wind speed.

In is another object of the present invention to provide wind turbine control methods and systems allowing an adaptation to the eventual wind turbine dynamic evolutions.

In one aspect, these and other objects are met by providing a method of controlling the operation of a variable speed wind turbine, tracking a power curve including a nominal operational region and sub-nominal operational regions, comprising steps of:

a) Implementing a control strategy to follow said power curve in said nominal operational region based on the use of demanded torque $T_d$ for controlling power P and on the use of demanded pitch $\theta_d$ for controlling demanded torque $T_d$.

b) Implementing a control strategy to follow said power curve in sub-nominal operational regions based on the use of demanded torque $T_d$ for controlling power P and on the setting of a constant optimum value for demanded pitch $\theta_d$ in each sub-nominal operational region.

In a preferred embodiment, in step a) said demanded pitch $\theta_d$ is determined by means of an adaptive predictive algorithm having as inputs torque set point $T_{SP}$, demanded torque $T_d$, measured generator speed $\Omega$ and measured pitch $\theta$. Hereby it is achieved a control method that improves the wind turbine power production in the nominal region because of its better adaptation to the wind turbine dynamic evolution and the consequent reduction of the control variables standard deviation with respect to its set points.

In another preferred embodiment, in step a) wind speed V and nacelle fore-aft acceleration $a_x$, are used as perturbations in said adaptive predictive algorithm. Hereby it is achieved a control method that allows a reduction of the wind turbine loads taking into account relevant specific load factors.

In another preferred embodiment, in step a) it is also used as an additional control variable the demanded pitch rate $\theta r_d$ corresponding to the demanded pitch $\theta_d$ which is determined by means of adaptive predictive algorithms having as inputs the demanded pitch $\theta_d$ and the measured pitch $\theta$. Hereby it is achieved a control method that allows an improved control of the pitch regulation.

In another preferred embodiment, in step b) the demanded torque $T_d$ is determined by means of an adaptive predictive algorithm having as inputs the generator speed set point $\Omega_{SP}$, the measured generator speed $\Omega$ and the measured torque T. Hereby it is achieved a control method that improves the wind turbine power production in the sub-nominal regions because of its better adaptation to the wind turbine dynamic evolution and the consequent reduction of the control variables standard deviation with respect to its set points.

In another preferred embodiment, the control method also comprises an step for implementing a control strategy in region pre-0 based on the use of demanded pitch $\theta_d$, determined by means of an adaptive predictive algorithm for controlling generator speed $\Omega$. Hereby it is achieved a control method that improves the wind turbine start-up procedure.

In another aspect, the above mentioned objects are met by a control system for a variable speed wind turbine comprising measuring devices for measuring at least wind speed V, generator speed $\Omega$, pitch angle $\theta$, power P and the nacelle fore-aft acceleration $a_x$, and also a control unit connected to said measuring devices and to the wind turbine control pitch and generator torque actuators comprising one or more of the following controllers implementing adaptive predictive algorithms taking into account the dynamics of the wind turbine physical components involved:

A Torque with Pitch Adaptive Predictive Controller having as inputs torque set point $T_{SP}$, demanded torque $T_d$, measured generator speed $\Omega$ measured pitch $\theta$, and as output the demanded pitch $\theta_d$ in the nominal operation region.

A Speed with Pitch Adaptive Predictive Controller having as inputs measured generator speed $\Omega$, and as output the optimum pitch $\theta$ in the sub-nominal operation regions.

A Speed with Torque Adaptive Predictive Controller having as inputs the generator speed set point $\Omega_{SP}$, the measured generator speed $\Omega$ and the measured torque T and as output the demanded pitch $T_d$, in the sub-nominal operation regions.

A Pitch Rate Adaptive Predictive Controller having as inputs the demanded pitch $\theta_d$ and the measured pitch $\theta$ and as output the demanded pitch rate $\theta r_d$.

Hereby it is achieved a wind turbine control system easy to implement because it does not need a previous knowledge of the dynamic of each individual component as it happen in known control systems. It also allows a reduction of wind turbine component costs because involves lesser requirements regarding dimensional tolerances than known control systems.

Other characteristics and advantages of this invention will be seen from the detailed description which follows from an illustrative but not limitative embodiment of its aim, based on the accompanying figures.

DETAILED DESCRIPTION OF PREFERRED EMBODIMENTS

Figure 1:
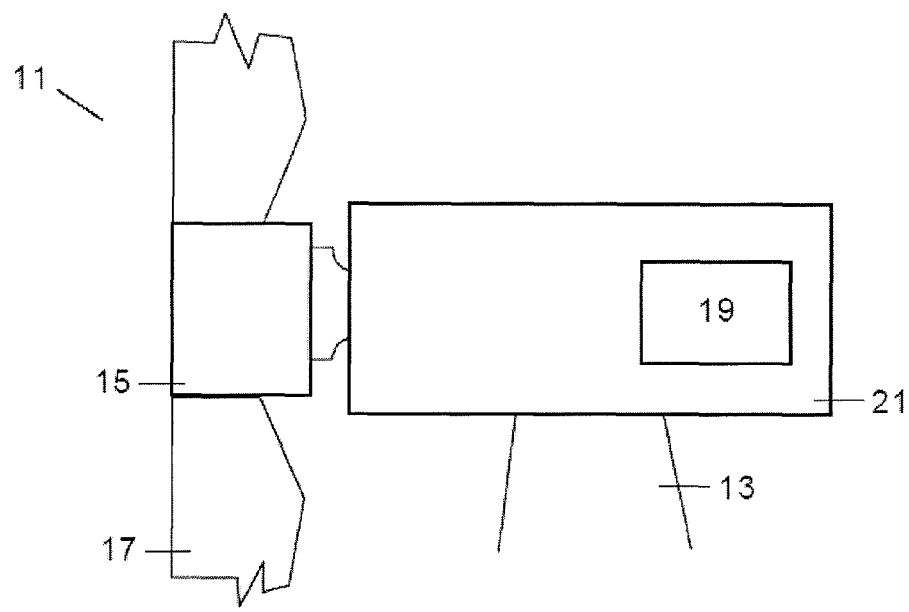
FIG. 1 shows schematically the main components of a wind turbine.

A typical wind turbine 11 comprises a tower 13 supporting a nacelle 21 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The power output from a modern wind turbine is typically controlled by means of a control system for regulating the pitch angle of the rotor blades and the generator torque. The rotor rotational speed and power output of the wind turbine can hereby be initially controlled e.g. before a transfer to a utility grid through a converter.

The control strategy in nominal region aims to produce power as closed as possible to nominal value.

The control strategy in sub-nominal regions (when there is not enough wind available for nominal production) aims to achieve an operation at the ideal aerodynamic output. The control strategy generally used in sub-nominal region for variable speed wind turbines is based on electrically adjusting the generator's torque to achieve the maximum output and this is carried out using a controller which receives signals indicating the speed of the generator and the power produced by the generator and which provides a torque reference signal to the converter to obtain the required power.

Figure 2:
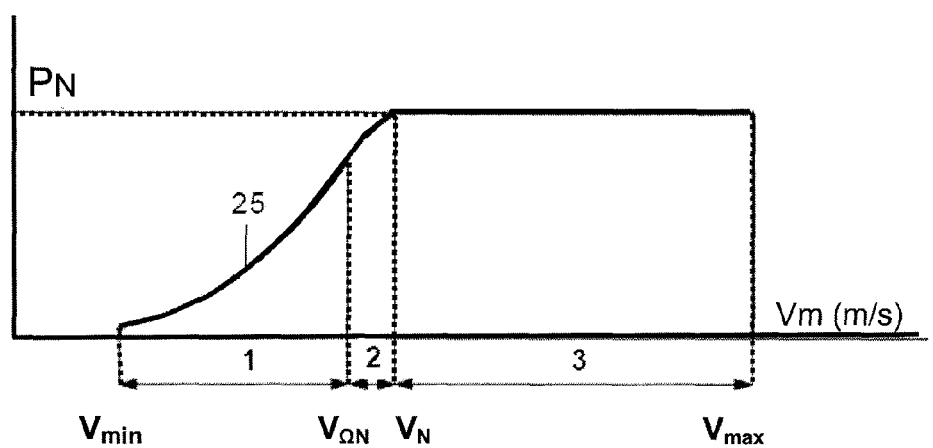
FIG. 2 shows the ideal power curve of a variable speed wind turbine.
Figure 3:
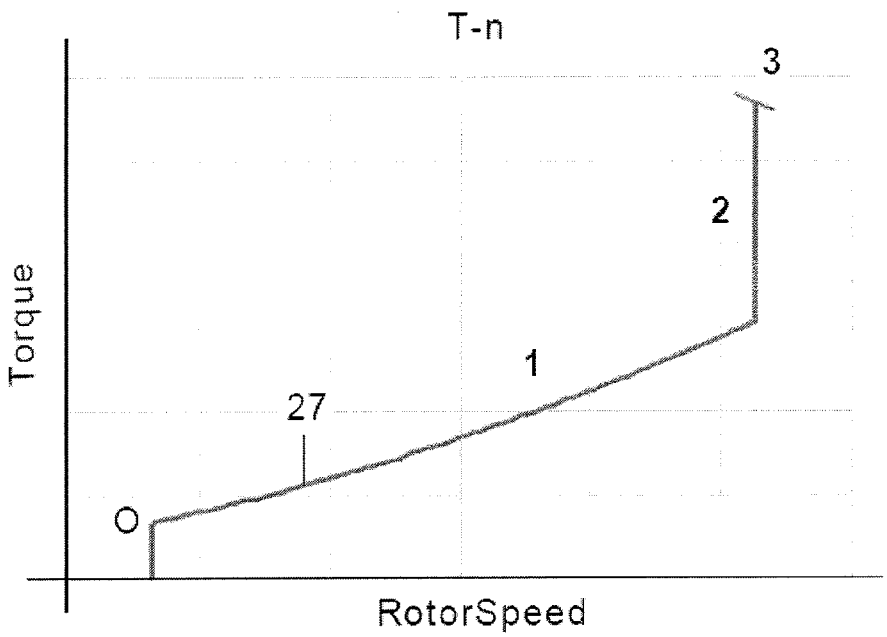
FIG. 3 shows the ideal torque vs. rotor speed curve normally used in the control system of a variable speed wind turbine.

Accordingly, the wind turbine controller uses a curve which defines the desired functional relationship between power and speed to achieve ideal output. A curve of this type is curve 25 in FIG. 2. In order to track the power curve of FIG. 2, the control strategy of wind turbines is usually divided into the operational regions 3, 2, 1, 0, shown also in the Torque-Rotor speed diagram 27 of FIG. 3, corresponding to predefined wind speed/rotor speed intervals, plus a pre-region 0 corresponding to the start up.

As was already said, known wind turbine controllers are not able to regulate the power output as close as possible to the power output prescribed by said power curve in all wind situations and particularly in cases of gusts and turbulences.

The wind turbine control methods and systems according to this invention are based on a new control strategy which is implemented using adaptive predictive control techniques.

In a preferred embodiment the control strategy in said regions implemented in the wind turbine control system is the following:

Nominal Operation: Region 3

The control objective for this region is to maintain nominal rotor speed and nominal power conditions, avoiding the capture of wind exceeding energy through pitch operation.

Control strategy: Generated power P is controlled with "measured" torque $T_3$, and this "measured" torque $T_3$ is controlled with pitch through an adaptive predictive controller which identifies in real time the dynamics between the pitch action and the "measured" torque $T_3$. Generated power set point $P_{sp}$, is equal to the machine nominal power. Torque set point $T_{sp}$ is equal to the machine nominal torque. It is to be noted that in the prior art the control strategy is based on two independent control mechanisms: power P is controlled with torque T, and generator speed $\Omega$ is controlled with pitch $\theta$.

Figure 4:
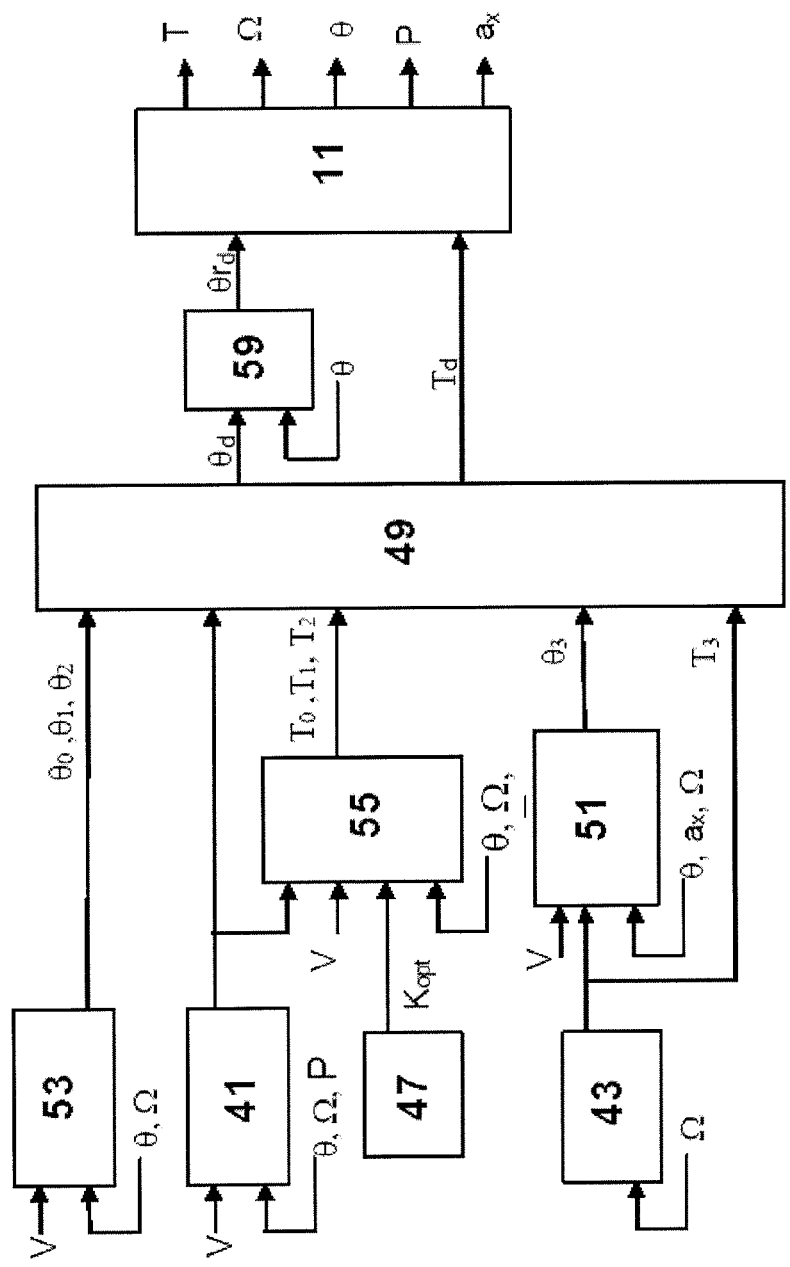
FIG. 4 is flow chart of functional blocks illustrating a wind turbine control method according to this invention.

Following FIG. 4, it can be seen that in region 3:

The input to the Pitch&Torque Select&Control Unit 49 is the operational mode determined in Mode Switch Unit 41 according to the measured values of wind speed V, pitch $\theta$, generator speed $\Omega$ and generated power P. The outputs in region 3 are the demanded pitch $\theta_d$ and the demanded torque $T_d$ corresponding to the "measured" torque $T_3$ and the demanded pitch $\theta_3$ provided by Power Controller 43 and Torque with Pitch Adaptive Predictive Controller 51 (see below).

The inputs to Pitch Rate Adaptive Predictive Controller 59 are said demanded pitch $\theta_d$ and the measured pitch $\theta$. The output is the demanded pitch rate $\theta r_d$ so that the measured pitch θ can converge efficiently towards demanded pitch $θ_d$. The Pitch Rate Adaptive Predictive Controller 59 is used to identify the pitch rate actuator dynamics in order to follow the demanded pitch $θ_d$ through predetermined trajectories configured in the Pitch Rate Adaptive Predictive Controller 59.

The inputs to Power Controller 43 are power set point $P_{sp}$, (the nominal power) and measured generator speed Ω. The output is "measured" torque $T_3$ calculated according to the equation $T = P/Ω$.

The inputs to Torque with Pitch Adaptive Predictive Controller 51 are torque set point $T_{sp}$ (the torque corresponding to nominal power), "measured" torque $T_3$, measured generator speed Ω and measured pitch θ. Measured wind speed V and measured nacelle fore-aft acceleration $a_x$, are introduced as perturbations. The output is demanded pitch $θ_3$. The Torque with Pitch Adaptive Predictive Controller 51 identifies in real time operation the cause-effect relation between "measured" torque $T_3$ and measured pitch θ as well as the dynamics of wind speed V and of nacelle fore-aft acceleration $a_x$, on the "measured" torque $T_3$ in order to update its internal dynamic model.

Wind turbine 11 is therefore controlled in region 3 through two control variables: the demanded torque $T_d$ and the demanded pitch $θ_d$.

Sub-Nominal Operation: Regions 2, 1, 0

Region 2

The control objective in this region is to keep the generator nominal speed generating the maximum possible power, while capturing the maximum available energy in the wind.

Control strategy: Generator speed Ω is controlled with torque $T_2$ through the Speed with Torque Adaptive Predictive Controller 55. Therefore the dynamics between both variables is online identified. Generator speed set point $Ω_{SP}$ is constant and equal to the generator nominal speed. Pitch $θ_2$ is positioned at its optimum value. Measured wind speed V and measured pitch angle θ are used as perturbations, because controller downwards logic can introduced pitch movements.

Region 1

The control objective in this region is to maximise wind power capture and therefore to maintain the lambda relation constant and equal to its analytical optimum value.

Control strategy: In order to keep the lambda relation in its optimum value an analytically deduced torque $T_1$ is applied to the wind turbine. Generator speed Ω is kept between connexion and nominal generator speed. Pitch $θ_1$ is positioned at its optimum value.

Region 0

The control objective in this region is to keep generator speed Ω at connexion speed in order to proceed with the start-up procedure.

Control strategy: Generator speed Ω is controlled with torque $T_0$ through the Speed with Torque Adaptive Predictive Controller 55. Generator speed set point $Ω_{sp}$ is constant and equal to the generator connection speed. Pitch $θ_0$ is positioned at its optimum value.

Following FIG. 4, it can be seen that in Regions 2, 1, 0:

The input to the Pitch&Torque Select&Control Unit 49 is the operational mode determined in Mode Switch Unit 41 according to the measured values of wind speed V, pitch θ, generator speed Ω and generated power P. The outputs are the demanded pitch $θ_d$ and the demanded torque $T_d$ corresponding to the demanded torques $T_2$, $T_1$, $T_0$ and the demanded pitch $θ_2$, $θ_1$, $θ_0$, provided by the Speed with Torque Adaptive Predictive Controller 55 and the Speed with Pitch Adaptive Predictive Controller 53 in each Region.

The demanded pitch $θ_d$ is kept constant in its optimum value in Regions 2, 1 and 0, therefore the Pitch Rate Adaptive Controller 59 should not be used but actually it is because downward controller logic can ask for pitch changes.

The inputs to Speed with Pitch Adaptive Predictive Controller 53 are measured generator speed Ω, measured wind speed V, and measured pitch θ, these two last ones are used as perturbations. The output is demanded pitch $θ_2$, $θ_1$, $θ_0$ which are set in its optimum value in Regions 2, 1 and 0.

The inputs to Speed with Torque Adaptive Predictive Controller 55 are the value of $K_{opt}$ provided by $K_{opt}$ Controller 47, the measured torque T and the measured generator speed Ω. The measured wind speed V and the measured pitch θ are used as perturbations of the generator speed Ω. The measured pitch θ is used as a perturbation because although it is not supposed to change within Regions 2, 1 and 0, some changes may be required in special circumstances. The Speed with Torque Adaptive Predictive Controller 55 identifies the dynamics between the demanded torque $T_2$, $T_1$, $T_0$ and the measured generator speed Ω.

Wind turbine 11 is therefore controlled in regions 2, 1 and 0 through the demanded torque $T_d$.

Region pre-0

The control objective in this region is to speed up the generator speed Ω from stop to the connexion speed and keep it around this value.

Control strategy: Generator speed Ω is controlled with pitch action through the Speed with Pitch Adaptive Predictive Controller 53. Generator speed set point $Ω_{sp}$ is the connexion speed. The Speed with Pitch Adaptive Predictive Controller 53 identifies the dynamics between the applied pitch $θ_{pre-0}$ and the measured generator speed Ω. The measured wind speed V and the measured torque T when connecting are used as perturbations of the generator speed Ω, which is the control variable in this Region.

The above-mentioned Torque with Pitch Adaptive Predictive Controller 51, Speed with Pitch Adaptive Predictive Controller 53, Speed with Torque Adaptive Predictive Controller 55 and Pitch Rate Adaptive Predictive Controller 59 are controllers based on adaptive predictive control algorithms according to the teachings of ES 460649. These controllers together with Mode Switch Unit 41, Power Controller 43, $K_{opt}$ Controller 47 (implementing all of them analytical models between output and input variables) and Pitch&Torque Select&Control Unit 49 are the basic components of the control system according to this invention.

The use of such controller technology and associated strategy in a wind turbine control system improves wind power capture and power quality with respect to PID controllers due to a better adaptation to the dynamic evolutions of the wind turbine.

Figure 5:
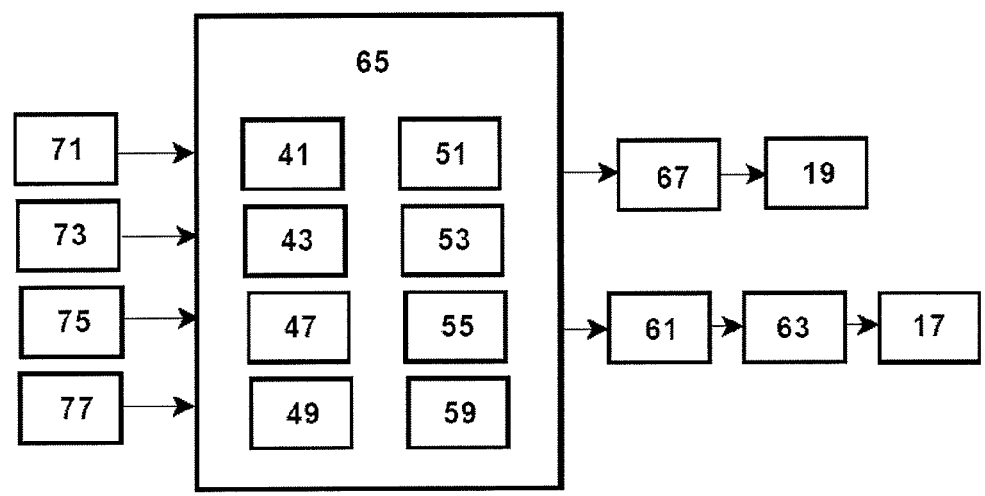
FIG. 5 is a block diagram illustrating a wind turbine control system according to this invention.

A wind turbine control system according to the present invention combines control means available in known variable speed wind turbines with the above mentioned controllers as schematically shown in FIG. 5.

Pitch control means involve blades 17, actuators 61, adjusting transmissions 63 and the main control unit 65. Similarly torque control means involve the generator 19, a generator command unit 67 and the main control unit 65.

The main control unit 65, that include all above mentioned controllers, receives input data such as wind speed V, generator speed Ω, pitch angle θ, power P, nacelle fore-aft acceleration $a_x$, from measuring devices 71, 73, 75, 77 and send output data $θ_d$, $T_d$ to, respectively, the actuator 61 for changing the angular position of the blades 17 and the generator command unit 67 for changing the reference for the power production.

Although the present invention has been fully described in connection with preferred embodiments, it is evident that modifications may be introduced within the scope thereof, not considering this as limited by these embodiments, but by the contents of the following claims.

The invention claimed is:

1. A method of controlling the operation of a variable speed wind turbine (11), tracking a power curve (25, 27) which includes a nominal operational region (3) and sub-nominal operational regions (2, 1, 0), wherein the method comprises an adaptive predictive algorithm that allows the operation of the wind turbine (11) in the nominal operation region (3) or in the sub-nominal operation regions of the power curve (25, 27) depending on the wind situations and comprises the steps of:
   a) implementing a control strategy to follow said power curve (25, 27) in said nominal operational region (3) based on the use of demanded torque $T_d$ for controlling power P and on the use of demanded pitch $θ_d$ for controlling demanded torque $T_d$;
   b) implementing a control strategy to follow said power curve (25, 27) in sub-nominal operational regions (2, 1, 0) based on the use of demanded torque $T_d$ for controlling power P and on the setting of a constant optimum value for demanded pitch $θ_d$ in each sub-nominal operational region (2, 1, 0).

2. A method of controlling the operation of a variable speed wind turbine (11) according to claim 1, wherein in step a) said demanded pitch $θ_d$ is determined by means of an adaptive predictive algorithm having as inputs torque set point $T_{sp}$, demanded torque $T_d$, measured generator speed Ω and measured pitch θ.

3. A method of controlling the operation of a variable speed wind turbine (11) according to claim 2, wherein wind speed V and nacelle fore-aft acceleration $a_x$ are used as perturbations in said adaptive predictive algorithm.

4. A method of controlling the operation of a variable speed wind turbine (11) according to claim 1, wherein in step a) the demanded pitch rate $θr_d$ corresponding to the demanded pitch $θ_d$ is also used as an additional control variable.

5. A method of controlling the operation of a variable speed wind turbine (11) according to claim 4, wherein said demanded pitch rate $θr_d$ is determined by means of an adaptive predictive algorithm having as inputs the demanded pitch $θ_d$ and the measured pitch θ.

6. A method of controlling the operation of a variable speed wind turbine (11) according to claim 1, wherein in step b) the demanded Torque $T_d$ is determined by means of an adaptive predictive algorithm having as inputs the generator speed set point $Ω_{sp}$, the measured generator speed Ω and the measured torque T.

7. A method of controlling the operation of a variable speed wind turbine (11) according to claim 6, wherein wind speed V and measured pitch θ are used as perturbations in said adaptive predictive algorithm.

8. A method of controlling the operation of a variable speed wind turbine (11) according to claim 1, wherein the method also comprises an step for implementing a control strategy in region pre-0 based on the use of the demanded pitch $θ_d$, determined by means of an adaptive predictive algorithm, for controlling generator speed Ω.

9. A variable speed wind turbine (11) controlled by a method as claimed in claim 1.

10. A control system for a variable wind turbine (11) comprising measuring devices (71, 73, 75, 77) for measuring at least wind speed V, generator speed Ω, pitch angle θ, power P, nacelle fore-aft acceleration $a_x$, and a control unit (65) connected to said measuring devices (71, 73, 75, 77) and to the wind turbine pitch and torque control actuators (61, 67), wherein the control unit (65) is adapted to carry out a method according to claim 1.

11. A control system for a variable wind turbine (11) according to claim 10, wherein said control unit (65) comprises one or more of the following controllers implementing adaptive predictive algorithms taking into account the dynamics of the wind turbine physical components involved:
   a Torque with Pitch Adaptive Predictive Controller (51) having as inputs torque set point $T_{sp}$, demanded torque $T_d$, measured generator speed Ω and measured pitch θ, and as output the demanded pitch $θ_d$ in the nominal operation region (3);
   a Speed with Pitch Adaptive Predictive Controller (53) having as inputs measured generator speed Ω and as output the optimum pitch θ the sub-nominal operation regions (2, 1, 0);
   a Speed with Torque Adaptive Predictive Controller (55) having as inputs the generator speed set point $Ω_{sp}$, the measured generator speed Ω and the measured torque T and as output the demanded pitch $T_d$, in the sub-nominal operation regions (2, 1, 0);
   a Pitch Rate Adaptive Predictive Controller (59) implementing adaptive predictive algorithms having as inputs the demanded pitch $θ_d$ and the measured pitch θ and as output the demanded pitch rate $θr_d$.

12. A variable speed wind turbine (11) comprising a control system as claimed in claim 10.

* * * * *